March 17, 1970   W. J. BAILEY, JR   3,501,653
IMPACT ELECTRIFICATION APPARATUS
Filed Jan. 15, 1969
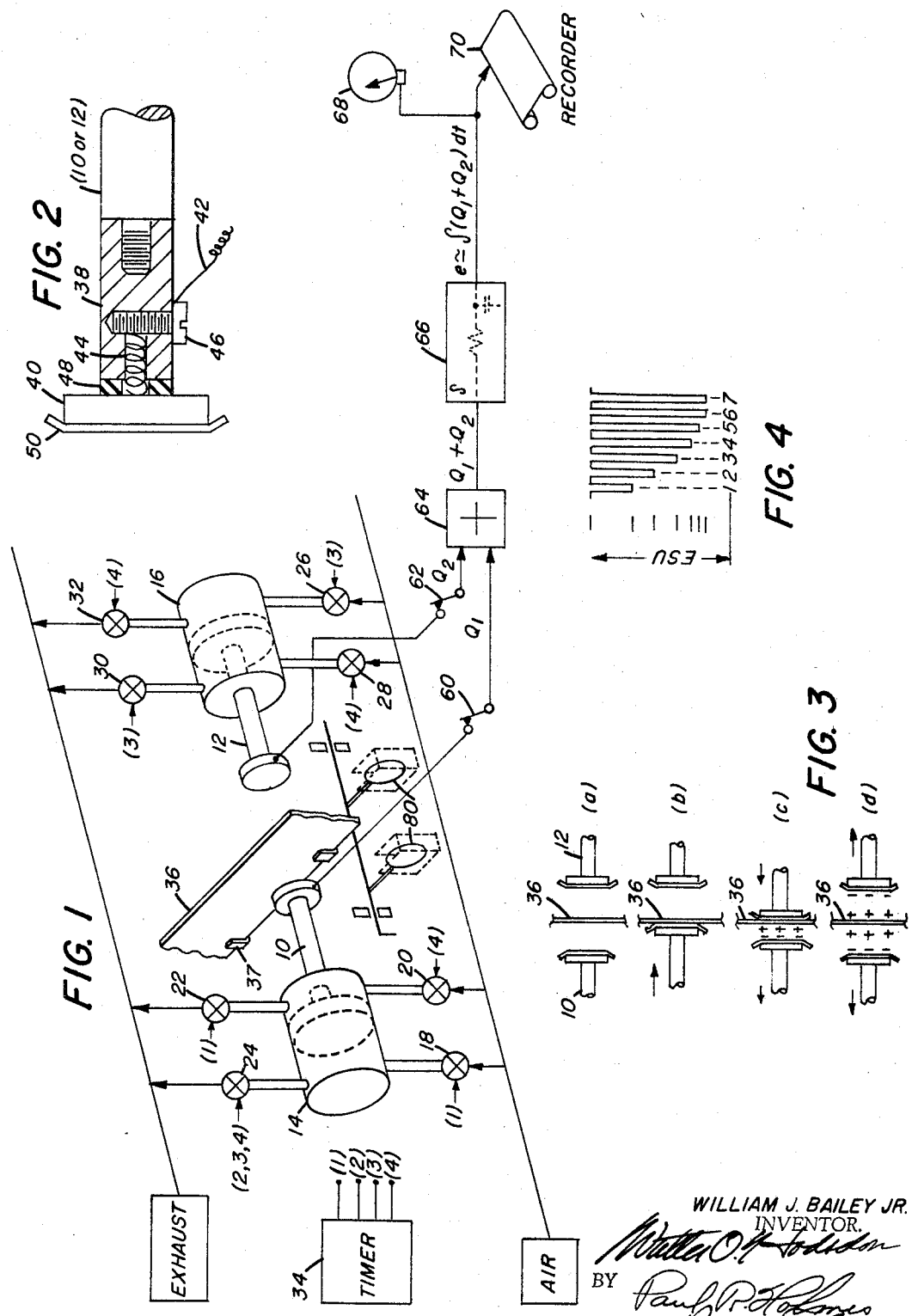
WILLIAM J. BAILEY JR.
INVENTOR.
BY
ATTORNEYS

United States Patent Office 3,501,653
Patented Mar. 17, 1970

3,501,653
IMPACT ELECTRIFICATION APPARATUS
William J. Bailey, Jr., Rochester, N.Y., assignor to Eastman Kodak Company, Rochester, N.Y., a corporation of New Jersey
Filed Jan. 15, 1969, Ser. No. 791,404
Int. Cl. H02n 1/00
U.S. Cl. 310—2                                   10 Claims

ABSTRACT OF THE DISCLOSURE

Apparatus for electrifying non-conductive material is disclosed in the environment of a test setup. Electrification is effected by means of crisp impacts of such material, accompanied by the free recoil of such material and/or the impacting means relative to each other.

BACKGROUND OF THE INVENTION

Field of the invention

This invention relates in general to electrostatics; in particular the invention relates to non-triboelectric electrostatics.

Given a certain combination of electrifiable substances, the degree of electrification of such substance by means of the invention is reliably predictable. And to illustrate this capability the invention is cast in the environment of a device for measuring the propensity of certain substances to electrify. It is to be appreciated, however, that the invention has wider implications and may, for example, find use in making xeric copies.

Description of the prior art

It is well known that whenever two dissimilar substances are in direct physical contact, a potential generally exists between their respective surfaces, causing a migration of charge between such surfaces. The degree to which such surface potentials cause electrification is dependent on numerous factors, of which the intimacy and duration of contact are critical. Surface contact electrification has been employed to test the electrification properties of substances: The surfaces of two substances to be checked for electrification are brought into direct contact; held there for a certain time; and then separated, the charge on each surface being measured by suitable means. Such a technique leaves much to be desired. It cannot handily indicate "tendency to electrify" (the degree of electrification hereof being too related to the duration and intimacy of surface contact); and it cannot indicate "tendency to spark" (a matter that is not only related to the chargeability of the substances concerned, but which matter is also related to the nature and structure of such surfaces). With respect to measuring "tendency to spark," contact electrification according to the prior art produces either too weak a field to cause sparking; or if sparking does occur, then—by virtue of such sparking—it becomes virtually impossible to measure the electrification which caused such sparking, or whether the electrification was at or above a certain threshold therefor.

SUMMARY OF THE INVENTION

To obviate the shortcomings of the prior art, the invention proposes electrification by means of short crisp impacts of a certain intensity, employing for such purpose the "free recoil" of one electrifiable substance away from another. Before proceeding further, however, it should be noted that the Journal of Applied Polymer Science, vol. 12 pp. 1515–1530 (1968) reports a related development in a paper titled "Epoxy Polymers. IV Impact Induced Voltage Generation," R. E. Cuthrell (Sandia Corp.).

Impacting has a two-fold purpose, viz it defines, with reasonable precision, short contact durations; and it causes better intimacy between the contacting members by squishing adsorbed air away from their contacting surfaces. Thus, the first crisp rap of, say, one non-conductive substance against another places a sharply defined measurable charge on each substance, the magnitudes of which charges are characteristic of the tendency of the substances concerned to electrify. Thereafter, successive free-recoil raps of the substances against each other cause their respective charges, interestingly, to build up to a certain level (and such buildup is in accordance with a certain progression, a matter to be discussed below). In other words, the second free-recoil rap does not dissipate the charge produced by the first rap, but rather adds an increment of charge to the charge produced by the first rap; similarly, the third rap adds incrementally to the charge of the second rap, and so forth.

As above noted, the "tendency to spark" depends to a large extent on the nature and structure of electrified surfaces. If such tendency is to be measured, sparking must occur; and the charge just prior to sparking must be determined. Also noted above is the fact that the prior art technique for electrifying may not develop sufficient charge to cause sparking; and it should be appreciated that mere impacting, also, may not be sufficient to develop a charge large enough to cause sparking.

To amplify the effect of impact-electrification for spark-producing purposes, the invention proposes an extension of the basic principles herein disclosed: Cast in the environment of a tool for testing the tendency of, say, photographic film and plastic to spark, such extension employs a pair of coaxially disposed rams. Plastic is placed on the head of each ram; and the film is placed between such rams along their line of travel. The plastic on one ram is brought into contact with one side of the film, the second ram, and plastic thereon, thereafter slamming against the other side of the film to cause the first ram to recoil freely away from the film. When the second ram is ultimately brought away from the film, its plastic "sees" a magnified charge, i.e. the charge which it itself produced plus the charge produced by the plastic on the recoiled ram as seen through the dielectric of the film. Successive repetition of the above procedure causes the film and plastic to become more and more charged until a certain electrification level is reached, or until sparking occurs—and to be noted is that sparking occurs for a lower electrification than would have occurred with either prior art electrification, or by mere impacting.

It will be appreciated that with a two-ram test arrangement as indicated, various kinds of measurements can be made; and depending on whether the rams support like or dissimilar materials, or whether one (or the other) ram is electrically grounded, etc., various electrification situations can be simulated. For example, in the example described above, the electrification properties of a hinged plastic film cassette are demonstrated.

An object of the invention is to provide apparatus for electrifying a substance by a certain amount dependent on the nature of that substance.

Another object of the invention is to provide apparatus for use in determining the tendency of substances to electrify.

Another object of the invention is to provide apparatus for use in determining the tendency of substances to spark.

Another object of the invention is to provide apparatus for use in simulating various situations involving the electrification of substances.

The invention will be described with reference to the figures wherein:

FIGURE 1 is a perspective view illustrating schematically a test setup embodying the invention;

FIGURE 2 is a sectional view illustrating the construction of the pick-off portion of a ram employed in the setup of FIGURE 1;

FIGURE 3 shows a series of views useful in describing the embodiment of FIGURE 1; and FIGURE 4 shows a plot of charge-buildup for successive impacts.

With reference to FIGURE 1, a pair of rams 10, 12 are coaxially disposed. The ram 10 is constrained for positioning solely toward and away from the ram 12 by means of an air cylinder 14; and the ram 12 is similarly constrained for positioning toward and away from the ram 10 by means of an air cylinder 16. Air is selectively applied to the cylinder 14 by means of valves 18, 20; and selectively exhausted therefrom by means of valves 22, 24. Similarly, air is selectively applied to the cylinder 16 by means of valves 26, 28; and selectively exhausted therefrom by means of valves 30, 32. All such valves are adapted to be electrically operated by means of signals which appear on the output leads of a timer 34, in accordance with techniques well known in the art.

A strip of film 36 is disposed in a holder 37 midway between the rams along the line of travel of such rams; and the faces of such film are disposed perpendicular to such line of travel. When extended, and without film 36 therebetween, the rams 10, 12 bear against each other, i.e. their extension overlap. Each ram supports a pick-off head as indicated in FIGURE 2. A bored non-conductive spacer 38 substantially electrically isolates a stainless steel tip 40 from the ram; and such tip is electrically connected to a lead 42 by means of a spring 44—housed in the spacer bore—and a screw 46. A thin rubber washer 48 may, depending on the nature of the substances which are to be checked for electrification be employed for shock-absorbing purposes; and a chip 50 of test material, e.g. plastic, to be electrified is secured by suitable means (conductive cement) to the tip 40.

The sequence of ram action is as follows (FIGURE 3): With the rams 10, 12 both withdrawn, FIGURE 3a, the timer 34 applies a signal to open the valves 18, 22, causing a chip of test material to be placed against one side of the film 36, FIGURE 3b. The valve 18 is then closed as the timer 34 opens the valve 24; thereafter the valves 26 and 30 are opened to cause the ram 12 to slam against the other side of the film 36, FIGURE 3c. Since the valves 22 and 24 are open at this time, the ram 10 freely recoils away from the film 36, the chip of test material supported by the ram 10 being thereby charged. Next, FIGURE 3d, the rams 10 and 12 are both restored to their start positions by appropriate signals to the valves 20, 24, 28, 32, whereby the whole sequence may be repeated.

Before proceeding further with the description, it is thought appropriate at this time to explain the constrained motion of the rams 10, 12. Since one measurement provided by means of the invention, i.e. the first impact, is a determination of the tendency of substances to electrify, any rubbing, say of the test material against the film, causes the charges thereon not to be the result solely of contact electrification, let alone the result of a first impact.

Charges which appear on the ram 10 test material, and on the ram 12 test material, are applied inductively through respective switches 60, 62 to a summing element 64. The switches 60, 62 permit the various kinds of measurements, which as indicated above are within the capability of the apparatus of FIGURE 1, to be made. That is, depending on whether one or both switches are opened or closed, and depending on what materials, if any, are supported on or between the rams, various electrifying situations can be simulated, FIGURE 1 indicating an arrangement for simulating the electrification of film housed within a hinged plastic cassette.

The summed charges are accumulated by an integrator 66 and then applied, for example, to a voltmeter 68 (with high input impedance) and/or to a movable-tape type of recorder 70, e.g. a Bausch and Lomb V.O.M.–5 recorder.

FIGURE 4 shows a record of E.S.U.'s resulting from successive impacts, numbered 1 through 7. In that the charge just prior to the first impact is zero, and since the charge just after the first impact is exclusively the result of such impacting, the charge produced by the first impact is definitively representative of the tendency of the materials concerned to electrify. Placing the head of the ram 10 against the film 36 prior to the second impact causes the measured E.S.U.'s to fall to zero. After the second impact, however, the accumulated charge which is recorded rises to a magnitude above that which obtained after the first impact. The reason for this is that, when the head of the ram 10 is placed against the film 36 prior to the second impact, the migration of charge is still in the same direction as before the first impact; notwithstanding the fact that the measured E.S.U.'s just prior to the second impact is zero. In other words, the charges in question are bound to the interface between the ram 10 plastic chip and the film 36, though such charges are appropriately situated on the film and plastic.

Each successive impact causes the recorded charge to build up until, in the case in question, the sixth impact is reached. To be noted is that each successive impact, up to the seventh impact, produces an incremental increase in E.S.U.'s which is predictably about seven-eighths greater than the immediately preceding incremental increase in charge. The seventh impact causes sparking, and the charge which is dissipated in such sparking is of such amount as to cause the record to reflect that the accumulated charge on the sixth and seventh impacts is about the same.

As above noted, the tendency to spark is a function of the structure and nature of the substances concerned, and that to make a meaningful measurement of such tendency, a spark must result, and the charge just prior to sparking must be measured. FIGURE 4 indicates that the sparking point is measureable; and FIGURE 3 (c and d) indicates that when the ram 12 is withdrawn from the film 36, it "sees" a double charge through the dielectric of the film, thus evidencing a greater ability to draw a spark than the prior art technique of mere contact electrification without impacting.

After the measurement, as in FIGURE 4, has been made, the whole procedure can, if desired, be repeated to produce a new measurement; and such new measurement will, importantly, be a reasonably faithful reproduction of that as shown in FIGURE 4. In other words, impact electrification is demonstrated as being a reliable way to charge an electrifiable substance by a certain reproducible amount.

To perform a repeat measurement, however, the impact-produced charges must be nullified. To this end, a pair of polonium alpha radiation devices 80, for example, may be swung briefly out of respective shields therefor into place between the plastic test chips and the film 36, thereby to ionize the region between the heads of the rams 10, 12 and the film 36.

Summarizing, the invention is directed to the concept of electrification by means of crisp impacts; and to provide such impacts the invention employs to advantage the free-recoil of one impacting member from another, regardless of which, or boths, recoils. Though the invention is cast in the environment of a versatile test setup, other adaptations and arrangements for the invention are practical as well. For example, it would be within the scope of the invention to employ pendulously arranged impacting members; and/or to drive the impacting members solenoidally; and/or to modify the timer 34 so that it runs repeatedly through it cycle; and/or to eliminate the overlap of the extended rams provided the test sample (e.g. film 36) is of sufficient thickness, etc.

The invention has been described in detail with particular reference to a preferred embodiment thereof, but

I claim:
1. Apparatus for use in electrifying non-conductive material comprising:
   (a) first impaction means for supporting said material,
   (b) second impaction means,
   (c) means for so supporting said first and second impaction means that said material supported by said first impaction means and said second impaction means may impact together, and in response thereto to recoil freely relative to each other, and
   (d) means for impacting the material on said first impaction means and said second impaction means against each other, thereby to produce a definitive charge on said material.

2. The apparatus of claim 1 wherein said means for impacting said material and said second impaction means includes means for impacting repeatedly said material and said second impaction means, thereby to cause the charge which is produced to build up progressively to a certain higher definitive amount.

3. The apparatus of claim 2 wherein that part of said second impaction means which contacts said material is electrically non-conductive.

4. The apparatus of claim 2 including means for so constraining said first and second impaction means that their respective impacting faces are substantially prevented from triboelectrically rubbing together.

5. Electrification apparatus comprising:
   (a) first and second impaction means adapted for relative positioning toward and away from each other,
   (b) means for use in supporting a substance between said first and second means,
   (c) first and second means for respectively operating said first and second impaction means to impact said impaction means directly against each other, or against each other through said substance, to produce electric charges on at least one of said impaction means, or on said substance, and
   (d) means adapted to receive and respond to said charges.

6. The apparatus of claim 5 including means cooperative with said first and second means for respectively operating said first and second impaction means to position said first impaction means against one side of said substance and thereafter to drive said second impaction means against the other side of said substance, causing said first impaction means thereby to recoil from said substance.

7. The apparatus of claim 6 wherein said means cooperative with said first and second means is further adapted to withdraw said second impaction means from said substance while said first impaction means is recoiled from said substance.

8. The apparatus of claim 5 wherein said means adapted to receive and respond to said charges includes integrating means, the charges produced by repetitive impacting being thereby accumulated.

9. The apparatus of claim 8 including means cooperative with said first and second means for respectively operating said first and second impaction means to position said first impaction means against one side of said substance and thereafter to drive said second impaction means against the other side of said substance, causing said first impaction means to recoil from said substance.

10. The apparatus of claim 9 wherein said means cooperative with said first and second means is further adapted to withdraw said second impaction means from said substance while said first impaction means is recoiled from said substance.

References Cited
UNITED STATES PATENTS

| | | | |
|---|---|---|---|
| 3,078,403 | 2/1963 | Walcott | 310—2 X |
| 3,365,593 | 1/1968 | Roof et al. | 310—8.8 X |
| 3,397,328 | 8/1968 | Schafft | 310—8.3 X |

OTHER REFERENCES

Cuthrell: "Epoxy Polymers. IV Impact-Induced Voltage Generation," Journal of Applied Polymer Science, vol. 12, No. 7, July 1968.

DONOVAN F. DOGGAN, Primary Examiner

U.S. Cl. X.R.

310—5